(12) United States Patent
Tani

(10) Patent No.: US 7,055,744 B2
(45) Date of Patent: Jun. 6, 2006

(54) DATA ENCODING DEVICE AND DATA DECODING DEVICE

(75) Inventor: Okie Tani, Tokyo (JP)

(73) Assignee: Tani Electronics Corporation, Tokyo (JP)

(*) Notice: Subject to any disclaimer, the term of this patent is extended or adjusted under 35 U.S.C. 154(b) by 51 days.

(21) Appl. No.: 10/432,219

(22) PCT Filed: Nov. 28, 2001

(86) PCT No.: PCT/JP01/10381

§ 371 (c)(1),
(2), (4) Date: May 22, 2003

(87) PCT Pub. No.: WO02/44997

PCT Pub. Date: Jun. 6, 2002

(65) Prior Publication Data

US 2004/0041026 A1 Mar. 4, 2004

(30) Foreign Application Priority Data

Nov. 28, 2000 (JP) ......................................... 2000-360790

(51) Int. Cl.
*G06K 7/10* (2006.01)

(52) U.S. Cl. ........................ 235/454; 235/487; 235/492; 235/493; 235/494; 714/752

(58) Field of Classification Search ................. 235/454, 235/487, 494, 492, 493; 714/752
See application file for complete search history.

(56) References Cited

U.S. PATENT DOCUMENTS

| 5,376,965 | A | * | 12/1994 | Nagasaki et al. | ........ | 348/231.4 |
| 5,588,069 | A | * | 12/1996 | Katayama et al. | .......... | 382/166 |
| 5,909,505 | A | * | 6/1999 | Katayama et al. | .......... | 382/164 |
| 6,058,498 | A | * | 5/2000 | Nagasaki et al. | ........... | 714/752 |
| 6,460,155 | B1 | * | 10/2002 | Nagasaki et al. | ........... | 714/752 |
| 6,608,938 | B1 | * | 8/2003 | Honda et al. | ................ | 382/236 |
| 6,622,276 | B1 | * | 9/2003 | Nagasaki et al. | ........... | 714/752 |

FOREIGN PATENT DOCUMENTS

| JP | A 6-111040 | 4/1994 |
| JP | A 6-231466 | 8/1994 |
| JP | A 8-096097 | 4/1996 |

* cited by examiner

*Primary Examiner*—Steven S. Paik
(74) *Attorney, Agent, or Firm*—Oliff & Berridge, PLC

(57) ABSTRACT

A code encoding device for outputting character, audio, and moving picture data converted to color marks by referring to a code conversion table (104, 204) and a code decoding device for outputting color marks converted to character, audio, and moving picture data by referring to a code conversion table (112, 212). High density recording is made possible through the medium of color marks. At the time of encoding and decoding of data, one unit of data is linked with one color among the plurality of colors to enable high density recording compared with conventional bar codes and two-dimensional codes.

32 Claims, 4 Drawing Sheets

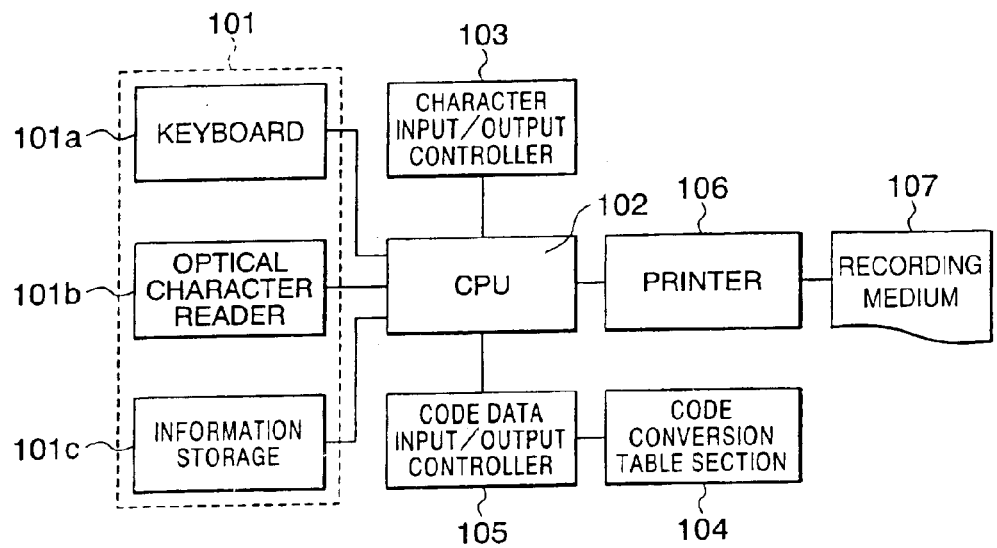

| COLOR MARK | COLOR CODE | CHARACTER CODE (JIS CODE) | CHARACTER DATA |
|---|---|---|---|
| BLUE 1 | 0000FF | 3B33 | 山 |
| ⋮ | ⋮ | ⋮ | ⋮ |
| RED 1 | FF0000 | 4544 | 田 |
| ⋮ | ⋮ | ⋮ | ⋮ |

DATA ENCODING DEVICE AND DATA DECODING DEVICE

This application is the U.S. National Stage application of PCT International Application No. PCT/JP01/10381 filed Nov. 28, 2001.

TECHNICAL FIELD

The present invention relates to a data encoding device and a data decoding device, and more particularly, relates to a device for encoding character data, audio data, and moving picture data to dot or stripe color marks and conversely for decoding the color marks to the above data, and thereby recording or reproducing the above data.

BACKGROUND ART

In the past, bar codes or two-dimensional codes have been used for encoding or decoding various types of data, and labelers or readers for the same are widely known.

The conventional bar codes and two-dimensional codes, however, record information by combinations of black and white binary data, so there have been the problems that the information density able to be recorded has been small and the scope of applications has therefore been extremely limited.

An object of the present invention is to solve the above conventional problems and provide a data encoding device and data decoding device able to link one unit of data to one color from among a plurality of colors and record at a high density while being a recording means used for visible medium of sheet, card, tape or the like.

DISCLOSURE OF INVENTION

To solve the above problems, the data encoding device and data decoding device according to the present invention are configured as follows:

The data encoding device according to the present invention is comprised of a character data input/output control section receiving as input character data from a keyboard, optical character reader, or fixed disk drive or other information storage and output the character data converted to character codes, a code conversion table section having a table linking character codes and color codes expressing colors, a code data input/output control section for referring to the color conversion table section when character codes are input and color codes corresponding to the character codes are output, and a color mark output device for outputting color marks corresponding to the color codes from the code data input/output control section to a recording medium of sheet, card, tape or the like.

Further, the data decoding device according to the present invention is comprised of an image pickup device for reading color marks relating to character data recorded on a recording medium, a color code input/output control section for outputting color marks read by the image pickup device converted to color codes, a color reverse conversion table section having a table linking color codes and character codes expressed by colors, a character code input/output control section for referring to the code reverse conversion table section when color codes are input and character codes corresponding to the color codes are output, and a character data output device for outputting character data corresponding to the character codes from the character code input/output control section.

Further, the data encoding device according to the present invention is comprised of an audio data input/output control section receiving as input audio data and outputting the audio data converted to audio codes, a code conversion table section having a table linking audio codes and color codes expressing colors, a code data input/output control section for referring to the color conversion table section when audio codes are input and color codes corresponding to the audio codes are output, and a color mark output device for outputting color marks corresponding to the color codes from the code data input/output control section to a recording medium of sheet, card, tape, or the like.

Also, the data decoding device according to the present invention is comprised of an image pickup device for reading color marks relating to audio data recorded on a recording medium, a color code input/output control section for outputting color marks read by the image pickup device converted to color codes, a color reverse conversion table section having a table linking color codes and audio codes expressed by colors, an audio code input/output control section for referring to the code reverse conversion table section when color codes are input and audio codes corresponding to the color codes are output, and an audio data output device for outputting audio data corresponding to the audio codes from the audio code input/output control section.

Also, the data encoding device according to the present invention is comprised of a code data input/output control section receiving as input moving picture data and outputting the moving picture data converted to color codes for each unit pixel and a color mark output device for outputting color marks corresponding to color codes from the code data input/output control section to a storage medium of sheet, card, tape, or the like.

Also, the data decoding device according to the present invention is comprised of an image pickup device for reading color marks relating to moving picture data recorded on a recording medium, a color code input/output control section for outputting color marks read by the image pickup device converted to color codes, and a moving picture data output device for outputting moving picture data corresponding to the color codes when color codes are input from the color code input/output control section.

BRIEF DESCRIPTION OF DRAWINGS

FIG. 1 is a block diagram of a first embodiment of a data encoding device according to the present invention.

FIG. 2 is a view of a code conversion table section of a data encoding device according to the first embodiment.

BEST MODE FOR CARRYING OUT THE INVENTION

Figures 3, 4:
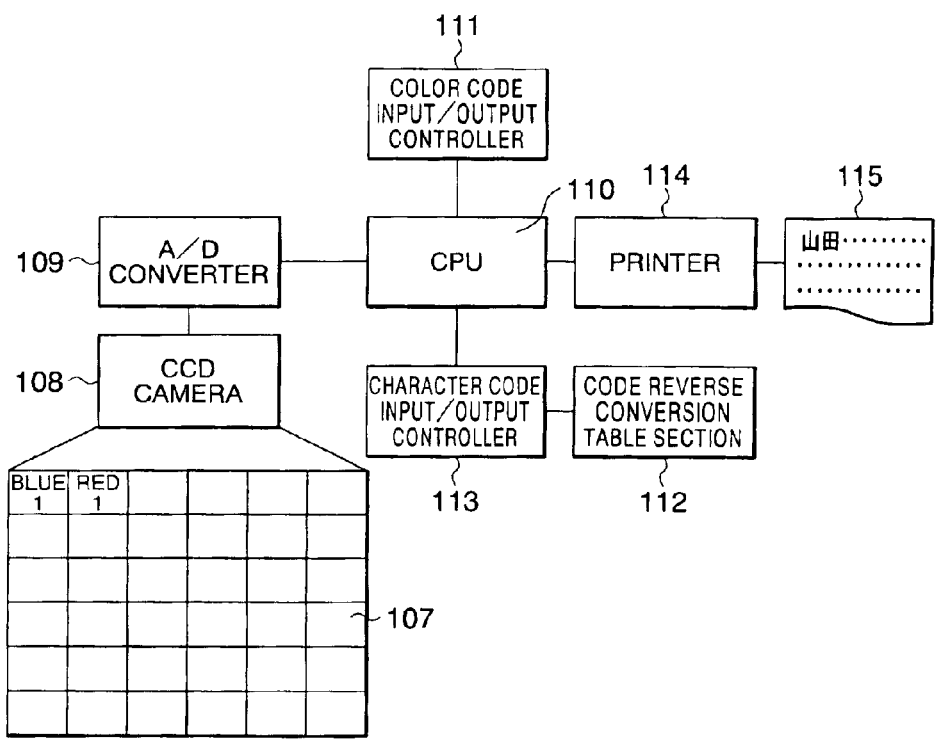
FIG. 3 is a block diagram of a first embodiment of a data decoding device according to the present invention.
FIG. 4 is a view of a code reverse conversion table section of a data decoding device according to a first embodiment.

Next, embodiments of the data encoding device and data decoding device according to the present invention will be explained in detail while referring to the drawings.

FIG. 1 is a block diagram of a character data encoding device according to a first embodiment of a data encoding device according to the present invention. This character data encoding device is comprised of a character data input device 101, CPU 102, character data input/output controller 103, code conversion table section 104, code data input/output controller 105, printer 106, and recording medium 107.

The character data input device 101 is provided with a keyboard 101a, an optical character reader (OCR) 101b, and a fixed disk drive or other information storage 101c.

The character data input through the character data input device 101 is sent through the CPU 102 to the character data input/output controller 103. The character data sent to the character data input/output controller 103 is converted to JIS codes or other character codes, then returned to the CPU 102.

The code conversion table section 104, as shown in FIG. 2, has a character code (JIS code) column 104a and a color code column 104b and forms a correspondence table between the character codes and the color codes relating to the plurality of items described in the character data column 104c.

The code data input/output controller 105 refers to the code conversion table unit 104 when the character codes are input from the CPU 102 and returns color codes corresponding to the character codes to the CPU 102.

The printer 106 used as the color mark output device receives as input the color codes returned from the code data input/output controller 105 to the CPU 102 and outputs color marks corresponding to the color codes to a sheet, card, tape, or other recording medium 107.

Here, the size of the color marks output from the printer 106 is freely determined in relation to the resolution of the later explained data decoding device. However, the minimum is one dot. This can express one color code, that is, one bit of character data.

Note that the size of the color marks is not limited to one dot. It is also possible to form the marks into groups of plurality of dots or stripes such as bar codes.

FIG. 3 is a block diagram of a character data decoding device according to a first embodiment of a data decoding device according to the present invention. This character data decoder is comprised of a CCD camera 108, an A/D converter 109, a CPU 110, a color code input/output controller 111, a code reverse conversion table section 112, a character code input/output controller 113, a printer 114, and a recording medium 115.

The CCD camera 108 used as the image pickup device reads the color marks recorded on the recording medium 107.

The color marks read by the CCD camera 108 are sent through the A/D converter 109 and CPU 110 to the color code input/output controller 111. The color marks sent to the color code input/output controller 111 are converted to color codes, then returned to the CPU 110.

The code reverse conversion table section 112, as shown in FIG. 4, has a color code column 112a and a character code (JIS code) column 112b. The code reverse conversion table section 112, in the same way as the code conversion table section 104, forms a correspondence table between the color codes and character codes relating to the items (colors) of the color mark column 112c.

The character data input/output controller 113 refers to the code reverse conversion table section 112 when color codes are input through the CPU 110 from the CPU 110 and returns character codes corresponding to the input color codes to the CPU 110.

The printer 114 used as the character data output device receives as input character codes returned from the character code input/output controller 113 to the CPU 110 and outputs character data corresponding to the character codes.

Figure 5:
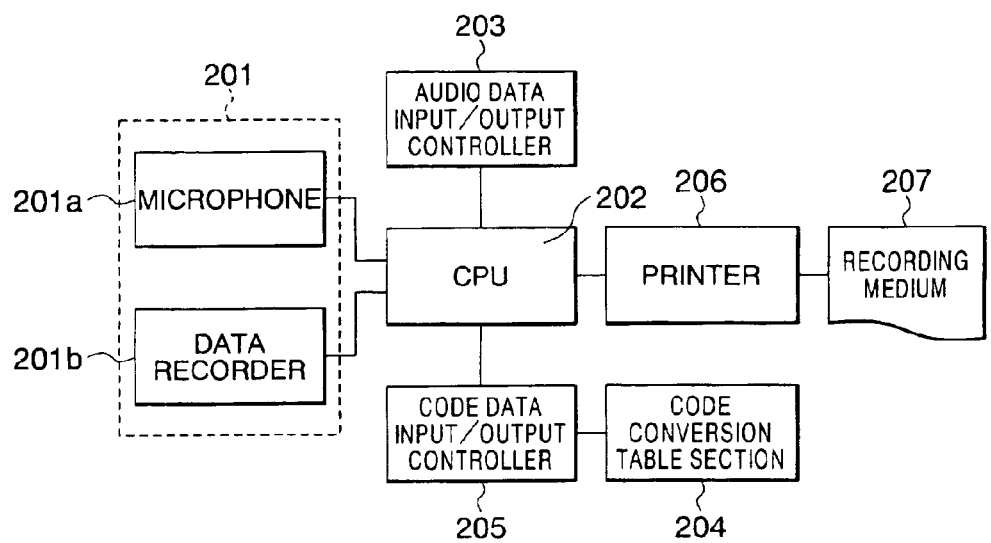
FIG. 5 is a block diagram of a second embodiment of a data encoding device according to the present invention.

FIG. 5 is a block diagram of an audio data encoding device according to a second embodiment of a data encoding device according to the present invention. This audio data encoding device is comprised of an audio data input device 201, CPU 202, audio data input/output controller 203, code conversion table section 204, code data input/output controller 205, printer 206, and a recording medium 207.

The audio data input device 201 is comprised of a microphone 201a or a tape recorder 201b.

The audio data from the audio data input device 201 is sent through the CPU 202 to the audio data input/output controller 203. The audio data sent to the audio data input/output controller 203 is converted to audio codes, then returned to the CPU 202.

Note that the audio data input device 201 may be a CD, fixed disk drive, or other information storage. In this case, the audio data input/output controller 203 can be omitted.

The code conversion table section 204, in the same way as the code conversion table section 104 shown in FIG. 2, forms a correspondence table between the audio codes and the color codes.

The code data input/output controller 205 refers to the code conversion table section 204 when the audio codes are input from the CPU 202 and returns color codes corresponding to the audio codes to the CPU 202.

The printer 206 used as the color mark output device receives as input the color codes returned from the code data input/output controller 205 to the CPU 202 and outputs color marks corresponding to the color codes to a sheet, card, tape, or other recording medium 207.

Here, the size of the color marks output from the printer 206, in the same way as the printer 106, is at the minimum one dot used to express one color code, that is, one bit of audio data.

Note that the size of the color marks is not limited to one dot. It is also possible to form the marks into groups of plurality of dots or stripes such as bar codes.

Figure 6:
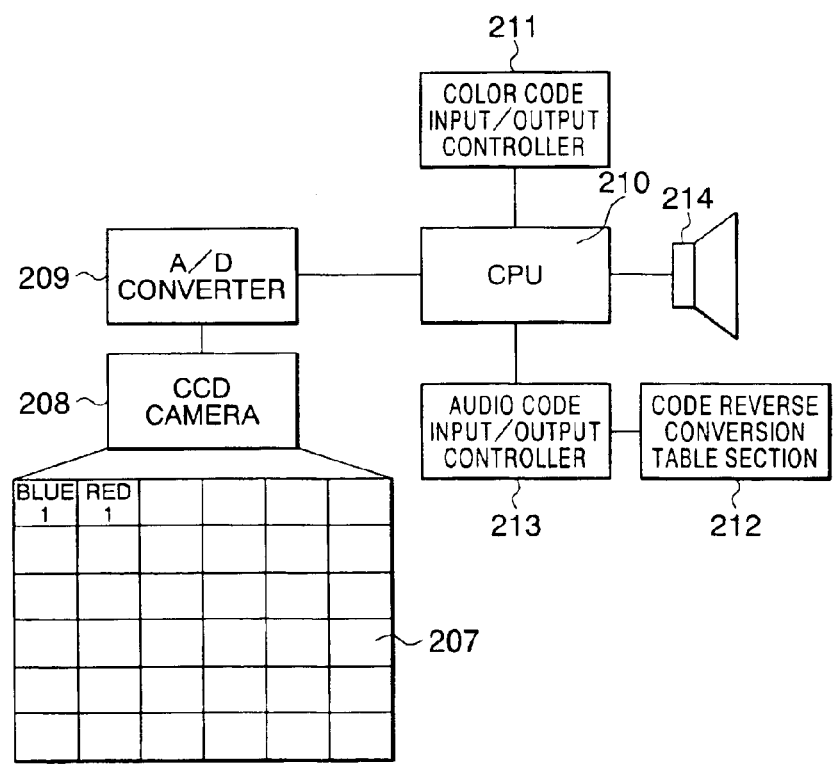
FIG. 6 is a block diagram of a second embodiment of a data decoding device according to the present invention.

FIG. 6 is a block diagram of an audio data decoding device according to a second embodiment of a data decoding device according to the present invention. This audio data decoder is comprised of a CCD camera 208, an A/D converter 209, a CPU 210, a color code input/output controller 211, a code reverse conversion table section 212, an audio code input/output controller 213, and a speaker 214.

The CCD camera 208 used as the image pickup device reads the color marks recorded on the recording medium 207.

The color marks read by the CCD camera 208 are sent through the A/D converter 209 and CPU 210 to the color code input/output controller 211. The color marks sent to the color code input/output controller 211 are converted to color codes, then returned to the CPU 210.

The code reverse conversion table section 212 forms a correspondence table between the color codes and audio codes in the same way as the code reverse conversion table section 112 shown in FIG. 4.

The audio code input/output controller 213 refers to the code reverse conversion table section 212 when color codes are input from the CPU 210 and returns audio codes corresponding to the color codes to the CPU 210.

The speaker 214 used as the audio data output device receives as input audio codes returned from the audio code input/output controller 213 to the CPU 210 and outputs audio data corresponding to the audio codes.

Figure 7:
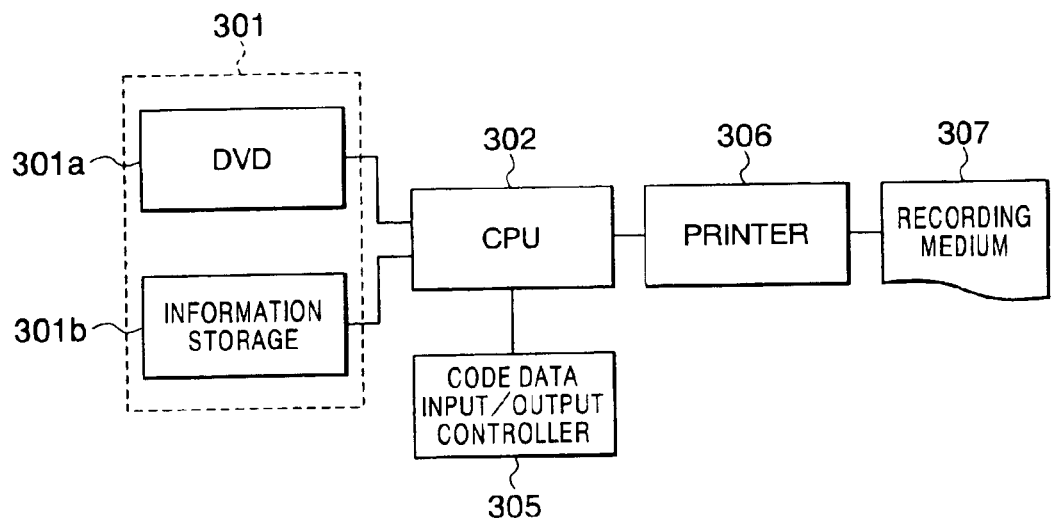
FIG. 7 is a block diagram of a third embodiment of a data encoding device according to the present invention.

FIG. 7 is a block diagram of a moving picture data encoding device according to a third embodiment of a data encoding device according to the present invention. This moving picture data encoding device is comprised of a moving picture data input device 301, CPU 302, code data input/output controller 305, printer 306, and recording medium 307.

The moving picture data input device 301 is comprised of a DVD 301a or fixed disk drive or other information storage 301b.

The moving picture data from the moving picture data input device 301 is sent through the CPU 302 to the code data input/output controller 305. The moving picture data sent to the code data input/output controller 305 is converted to color codes for each unit pixel and returned to the CPU 302.

The printer 306 used as the color mark output device receives as input the color codes returned from the code data input/output controller 305 to the CPU 302 and outputs color marks corresponding to the color codes to a sheet, card, tape, or other recording medium 307.

Here, the size of the color marks output from the printer 306, in the same way as the printer 106, is at the minimum one dot used to express one color code, that is, one bit of moving picture data.

Note that the size of the color marks is not limited to one dot. It is also possible to form the marks into groups of plurality of dots or stripes such as bar codes.

Figure 8:
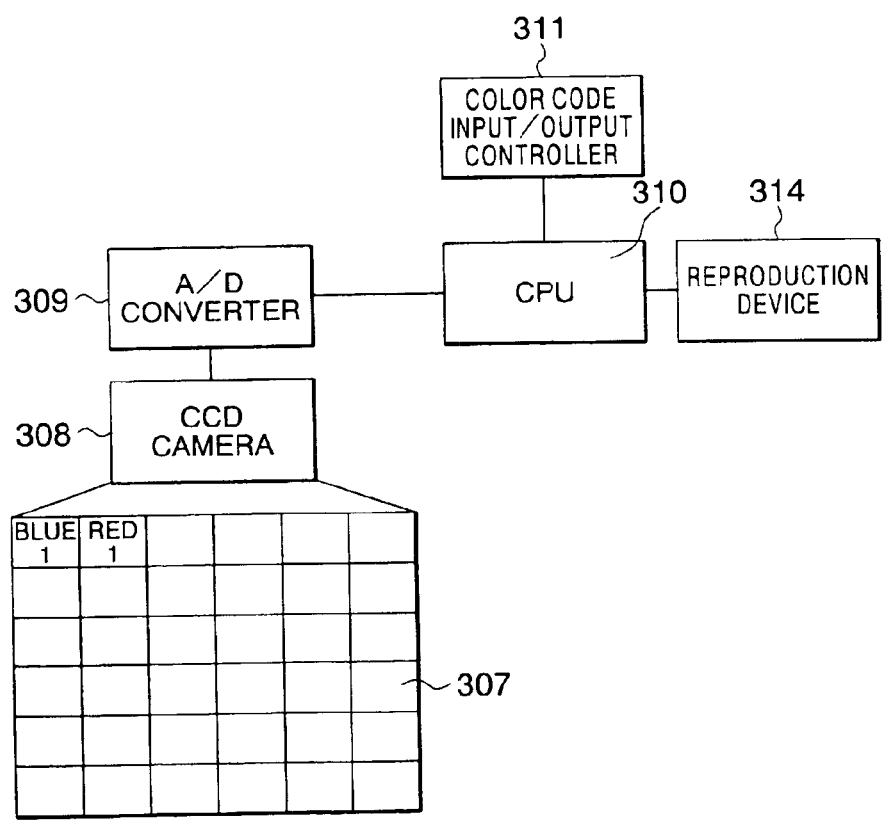
FIG. 8 is a block diagram of a third embodiment of a data decoding device according to the present invention.

FIG. 8 is a block diagram of a moving picture data decoding device according to a third embodiment of a data decoding device according to the present invention. The moving picture data decoding device is comprised of a CCD camera 308, an A/D converter 309, a CPU 310, a color code input/output controller 311, and a reproduction device 314.

The CCD camera 308 used as the image pickup device reads the color marks recorded on the recording medium 307.

The color marks read by the CCD camera 308 are sent through the A/D converter 309 and the CPU 310 to the color code input/output controller 311. The color marks sent to the color code input/output controller 311 are converted to color codes, then returned to the CPU 310.

The reproduction device 314 used as the moving picture data output device receives as input the color codes returned to the CPU 310 from the color code input/output controller 311 and outputs moving picture data corresponding to the color codes.

Note that in the above embodiments, the character data, audio data, and moving picture data were explained as handled separately, but it is also possible to configure the apparatuses to handle these data together.

Further, known configurations other than those explained can also be used for the data input device and data output device.

Further, the recording medium is not limited to one used alone. It is also possible to use a recording medium attached to a credit card, medical chart, ID card, passport, or other article whose recorded information should not be easily accessible to a third party. In this case, with just the eye, it is only possible to view sets of extremely small color dots or color stripes and therefore it is possible to maintain the confidentiality of the data.

According to the present invention, according to the configuration of the data encoding device and data decoding device described above, it is possible to record character, audio, or moving picture data at an extremely high density and over a broad range compared with the conventional bar code or two-dimensional code on a sheet, card, tape, or other recording medium.

Further, since an electromagnetic medium, for example, a floppy disk, is not used for the recording medium, the problem of data loss etc. does not arise and handling is easy.

Further, as explained above, there is the effect that the confidentiality of the data is high.

INDUSTRIAL APPLICABILITY

By using colors, it is possible to make the recordable information density extremely high. The invention can be utilized for encoding or decoding large volumes of various types of data and utilized for a wide range of applications.

What is claimed is:

1. A data encoding device comprising:
   a character data input/output control section for receiving character data as input, converting the character data to character codes, and outputting the character codes,
   a code conversion table section having a table linking character codes and color codes expressing colors,
   a code data input/output control section for referring to said code conversion table section when character codes are input and color codes corresponding to said character codes are output, and
   a color mark output device for outputting to a recording medium color marks corresponding to the color codes from the code data input/output control section.

2. The data encoding device according to claim 1, wherein the character data input/output control section receives character data from one of a keyboard, an optical character reader, and a fixed disk drive or other information storage.

3. The data encoding device according to claim 1, wherein the recording medium is one of a sheet, a card or a tape.

4. A data decoding device comprising:
   an image pickup device for reading color marks relating to character data recorded on a recording medium,
   a color code input/output control section for converting color marks read by said image pickup device to color codes, and outputting the color codes,
   a code conversion table section having a table linking color codes and character codes expressed by colors,
   a character code input/output control section for referring to the code conversion table section when color codes are input and character codes corresponding to said color codes are output, and
   a character data output device for outputting character data corresponding to the character codes from the character code input/output control section.

5. A data encoding device comprising:
   an audio data input/output control section for receiving audio data as input, converting the audio data to audio codes and outputting the audio codes,
   a code conversion table section having a table linking audio codes and color codes expressing colors,
   a code data input/output control section for referring to the code conversion table section when audio codes are input and color codes corresponding to the audio codes are output, and a color mark output device for outputting to a recording medium color marks corresponding to the color codes from the code data input/output control section.

6. The data encoding device according to claim 5, wherein the recording medium is one of a sheet, a card or a tape.

7. A data decoding device comprising:

an image pickup device for reading color marks relating to audio data recorded on a recording medium, a color code input/output control section for converting color marks read by said image pickup device to color codes, and outputting the color codes, a code conversion table section having a table linking color codes and audio codes expressed by colors, an audio code input/output control section for referring to the code conversion table section when color codes are input and audio codes corresponding to the color codes are output, and an audio data output device for outputting audio data corresponding to the audio codes from the audio code input/output control section.

8. A data encoding device comprising:

a code data input/output control section for receiving moving picture data as input, converting the moving picture data to color codes for each unit pixel, and outputting the color codes, and a color mark output device for outputting to a recording medium color marks corresponding to color codes from the code data input/output control section.

9. The data encoding device according to claim 8, wherein the recording medium is one of a sheet, a card or a tape.

10. A data decoding device comprising:

an image pickup device for reading color marks relating to moving picture data recorded on a recording medium, a color code input/output control section for converting color marks read by said image pickup device to color codes, and a moving picture data output device for outputting moving picture data corresponding to the color codes when color codes are input from the color code input/output control section.

11. A data encoding method comprising:

a type-specific data/inout output control step of receiving type-specific data as input, converting the type-specific data to type-specific codes, and outputting the type-specific codes, linking type-specific codes and color codes expressing colors using a code conversion table, a code table input/output control step of referring to the code conversion table when type-specific codes are input and color codes corresponding to the type-specific codes are output, and outputting from a color mark output device to a recording medium color marks corresponding to the color codes from the code data input/output control step.

12. The data encoding method of claim 11, wherein the type-specific data is character data.

13. The data encoding method of claim 11, wherein the type-specific data input/output control step includes receiving character data as type-specific data from one of a keyboard, an optical character reader, and a fixed disk drive or other information storage.

14. The data encoding method of claim 11, wherein the type-specific data is audio data.

15. The data encoding method of claim 11, wherein the type-specific data is moving picture data.

16. The data encoding method of claim 11, wherein the outputting step includes outputting the color marks to one of a sheet, a card, or a tape.

17. A data encoding method comprising:

inputting audio codes, linking audio codes and color codes expressing colors using a code conversion table, a code data input/output control step of referring to the code conversion table section when audio codes are input and color codes corresponding to the audio codes are output, and outputting from a color mark output device to a recording medium color marks corresponding to the color codes from the code data input/output control step.

18. A data decoding method comprising:

reading with an image pickup device color marks relating to type-specific data recorded on a recording medium, a color code input/output control step of converting color marks read by the image pickup device to color codes, and outputting the color codes, linking color codes and type-specific codes expressed by colors using a code conversion table, a type-specific code input/output control step of referring to the code conversion table section when color codes are input and type-specific codes corresponding to the color codes are output, and outputting from a type-specific data output device type-specific data corresponding to the type-specific codes from the type-specific code input/output control step.

19. The data encoding method of claim 18, wherein the type-specific data is character data.

20. The data encoding method of claim 18, wherein the type-specific data is audio data.

21. The data encoding method of claim 18, wherein the type-specific data is moving picture data.

22. A computer program product including computer readable program steps for executing a data encoding method, the data encoding method comprising:

a type-specific data input/output control step of receiving type-specific data as input, converting the type-specific data to type-specific codes, and outputting the type-specific codes, linking type-specific codes and color codes expressing colors using a code conversion table, a code data input/output control step of referring to the code conversion table when type-specific codes are input and color codes corresponding to the type-specific codes are output, and outputting from a color mark output device to a recording medium color marks corresponding to the color codes from the code data input/output control step.

23. The computer program product according to claim 22, wherein the type-specific data is character data.

24. The computer program product according to claim 22, wherein the type-specific data input/output control step includes receiving character data as type-specific data from one of a keyboard, an optical character reader, and a fixed disk drive or other information storage.

25. The computer program product according to claim 22, wherein the type-specific data is audio data.

26. The computer program product according to claim 22, wherein the type-specific data is moving picture data.

27. The computer program product according to claim 22, wherein the outputting step includes outputting the color marks to one of a sheet, a card or a tape.

28. A computer program product including computer readable program steps for executing a data encoding method, the method comprising:

inputting audio codes, linking audio codes and color codes expressing colors using a code conversion table, a code data input/output control step of referring to the code conversion table section when audio codes are input and color codes corresponding to the audio codes are output, and outputting from a color mark output device to a recording medium color marks corresponding to the color codes from the color data input/output control step.

29. A computer program product including computer readable program steps for executing a data decoding method, the data decoding method comprising:

reading with an image pickup device color marks relating to type-specific data recorded on a recording medium, a color code input/output control step of converting color marks read by the image pickup device to color codes, and outputting the color codes, linking color codes and type-specific codes expressed by colors using a code conversion table, a type-specific code input/output control step of referring to the code conversion table section when color codes are input and type-specific codes corresponding to the color codes are output, and outputting from a type-specific data output device type-specific data corresponding to the type-specific codes from the type-specific code input/output control step.

30. The computer program product according to claim 29, wherein the type-specific data is character data.

31. The computer program product according to claim 29, wherein the type-specific data is audio data.

32. The computer program product according to claim 29, wherein the type-specific data is moving picture data.

\* \* \* \* \*